United States Patent [19]
Katzenmeyer et al.

[11] Patent Number: 5,557,345
[45] Date of Patent: Sep. 17, 1996

[54] INTERCHANGEABLE TETHERED GLASSES

[76] Inventors: Betty L. Katzenmeyer; Kent R. Katzenmeyer, both of 103 Walker St., Evansville, Wis. 53536

[21] Appl. No.: 402,638

[22] Filed: Mar. 13, 1995

[51] Int. Cl.$^6$ .................... G02C 1/00; G02C 11/02; A44C 13/00
[52] U.S. Cl. .................... 351/66; 351/52; 63/1.1
[58] Field of Search .................... 351/41, 51, 52, 351/66, 114, 119, 121, 123, 158, 140; 63/1.1, 13

[56] References Cited

U.S. PATENT DOCUMENTS

| | | | |
|---|---|---|---|
| D. 324,871 | 3/1992 | Cordet et al. | D16/103 |
| D. 334,390 | 3/1993 | Conway | D16/112 |
| D. 334,391 | 3/1993 | Wilson | D16/123 |
| D. 335,135 | 4/1993 | Bolle | D16/112 |
| 2,960,787 | 11/1960 | Quinones et al. | 63/1.1 |
| 4,153,346 | 5/1979 | Gomer | 351/52 |
| 5,161,234 | 11/1992 | Nitta | 351/51 |

FOREIGN PATENT DOCUMENTS

| 175913 | 8/1905 | Germany | 351/111 |
|---|---|---|---|

*Primary Examiner*—Huy Mai

[57] ABSTRACT

Interchangeable tethered glasses for adjustably positioning relative to a face of an individual for filtering light into eyes of the individual. The inventive device includes a frame assembly for supporting a pair of lenses over eyes of an individual. An ear engaging assembly extends from opposed sides of the frame assembly for engaging ears of the individual to secure the frame assembly relative thereto. The ear engaging assembly includes a tether extendable over the ears of the individual, and a weight coupled to a distal end of the tether for maintaining a desired tension within the tether.

12 Claims, 4 Drawing Sheets

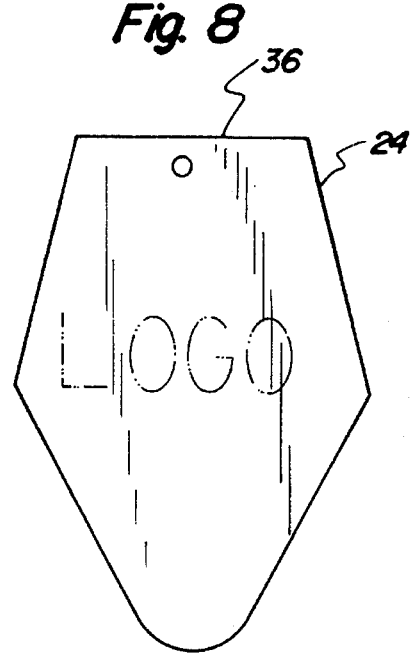
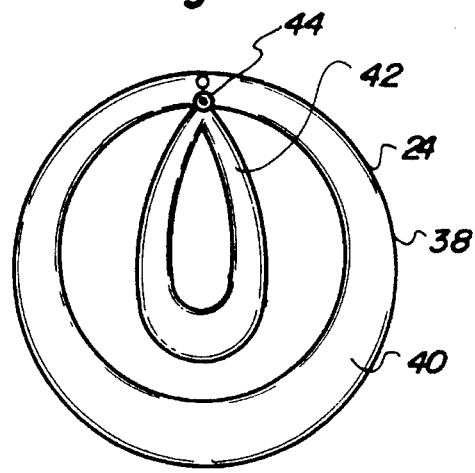
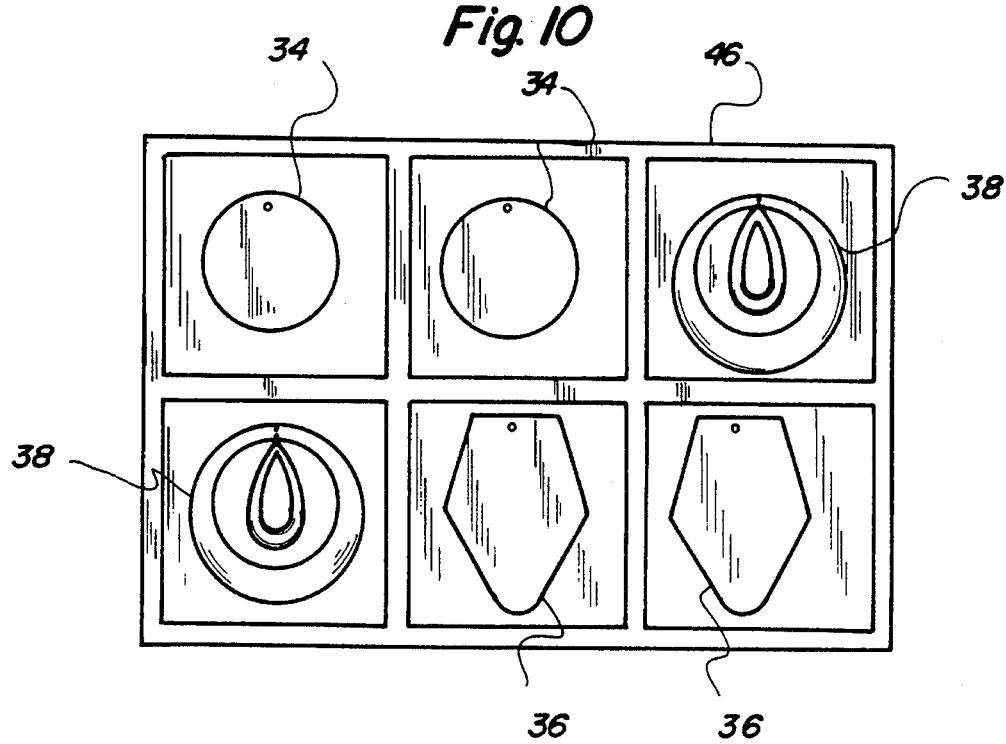

INTERCHANGEABLE TETHERED GLASSES

BACKGROUND OF THE INVENTION

1. Field of the Invention

The present invention relates to eyeglass structures and more particularly pertains to interchangeable tethered glasses for adjustably positioning relative to a face of an individual for filtering light into eyes of the individual.

2. Description of the Prior Art

The use of eyeglass structures is known in the prior art. More specifically, eyeglass structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art eyeglass structures include U.S. Pat. No. 4,153,346; U.S. Design patent application Ser. No. 335,135; U.S. Design patent application Ser. No. 324,871; U.S. Design patent application Ser. No. 334,391; and U.S. Design patent application Ser. No. 334,390.

While these devices fulfill their respective, particular objectives and requirements, the aforementioned patents do not disclose interchangeable tethered glasses for adjustably positioning relative to a face of an individual for filtering light into eyes of the individual which include a frame assembly for supporting a pair of lenses over eyes of an individual, and an ear engaging assembly extending from opposed sides of the frame assembly for engaging ears of the individual to secure the frame assembly relative thereto, wherein the ear engaging assembly includes a tether extendable over the ears of the individual, and a weight coupled to a distal end of the tether for maintaining a desired tension within the tether.

In these respects, the interchangeable tethered glasses according to the present invention substantially departs from the conventional concepts and designs of the prior art, and in so doing provides an apparatus primarily developed for the purpose of adjustably positioning relative to a face of an individual for filtering light into eyes of the individual.

SUMMARY OF THE INVENTION

In view of the foregoing disadvantages inherent in the known types of eyeglass structures now present in the prior art, the present invention provides a new interchangeable tethered glasses construction wherein the same can be utilized for adjustably positioning relative to a face of an individual for filtering light into eyes of the individual. As such, the general purpose of the present invention, which will be described subsequently in greater detail, is to provide a new interchangeable tethered glasses apparatus and method which has many of the advantages of the eyeglass structures mentioned heretofore and many novel features that result in interchangeable tethered glasses which are not anticipated, rendered obvious, suggested, or even implied by any of the prior art eyeglass structures, either alone or in any combination thereof.

To attain this, the present invention generally comprises interchangeable tethered glasses for adjustably positioning relative to a face of an individual to filter light into eyes of the individual. The inventive device includes a frame assembly for supporting a pair of lenses over eyes of an individual. An ear engaging assembly extends from opposed sides of the frame assembly for engaging ears of the individual to secure the frame assembly relative thereto. The ear engaging assembly includes a tether extendable over the ears of the individual, and a weight coupled to a distal end of the tether for maintaining a desired tension within the tether.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carded out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new interchangeable tethered glasses apparatus and method which has many of the advantages of the eyeglass structures mentioned heretofore and many novel features that result in interchangeable tethered glasses which are not anticipated, rendered obvious, suggested, or even implied by any of the prior art eyeglass structures, either alone or in any combination thereof.

It is another object of the present invention to provide a new interchangeable tethered glasses which may be easily and efficiently manufactured and marketed.

It is a further object of the present invention to provide a new interchangeable tethered glasses which is of a durable and reliable construction.

An even further object of the present invention is to provide a new interchangeable tethered glasses which is susceptible of a low cost of manufacture with regard to both materials and labor, and which accordingly is then susceptible of low prices of sale to the consuming public, thereby making such interchangeable tethered glasses economically available to the buying public.

Still yet another object of the present invention is to provide a new interchangeable tethered glasses which provides in the apparatuses and methods of the prior art some of the advantages thereof, while simultaneously overcoming some of the disadvantages normally associated therewith.

Still another object of the present invention is to provide a new interchangeable tethered glasses for adjustably positioning relative to a face of an individual for filtering light into eyes of the individual.

Yet another object of the present invention is to provide a new interchangeable tethered glasses which include a frame assembly for supporting a pair of lenses over eyes of an individual, and an ear engaging assembly extending from opposed sides of the frame assembly for engaging ears of the individual to secure the frame assembly relative thereto, wherein the ear engaging assembly includes a tether extendable over the ears of the individual, and a weight coupled to a distal end of the tether for maintaining a desired tension within the tether.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an elevational view of a first alternative weight of the invention.

FIG. 9 is an elevational view of a second alternative weight of the invention.

FIG. 10 is an elevational view of a storage box for containing a plurality of disparately shaped weights of the invention.

DESCRIPTION OF THE PREFERRED EMBODIMENT

Figure 1:
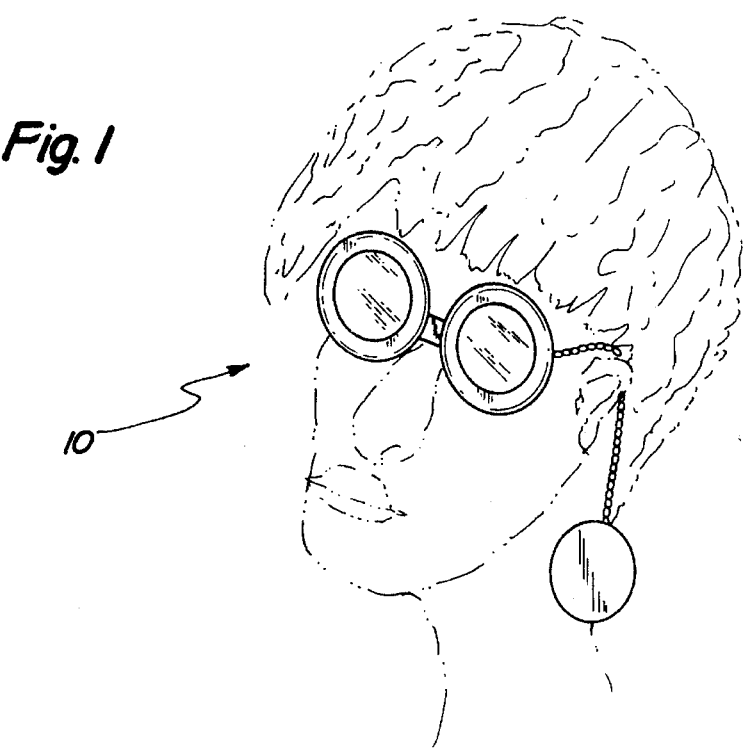
FIG. 1 is an isometric illustration of interchangeable tethered glasses according to the present invention in use.

With reference now to the drawings, and in particular to FIGS. 1-10 thereof, a new interchangeable tethered glasses embodying the principles and concepts of the present invention and generally designated by the reference numeral 10 will be described.

More specifically, it will be noted that the interchangeable tethered glasses 10 comprise a pair of lenses 12 and a frame means 14 for supporting the lenses over the eyes of an individual utilizing the device 10, as shown in FIG. 1 of the drawings. An ear engaging means 16 is coupled to opposed ends of the frame means 14 for engaging the ears of the individual to secure the frame means 14 and associated lenses 12 relative to the head of the individual. By this structure, the lenses are supported in front of the eyes of the wearer to filter light passing therethrough into the wearer's eyes to reduce glare and intensity thereof.

Figure 2:
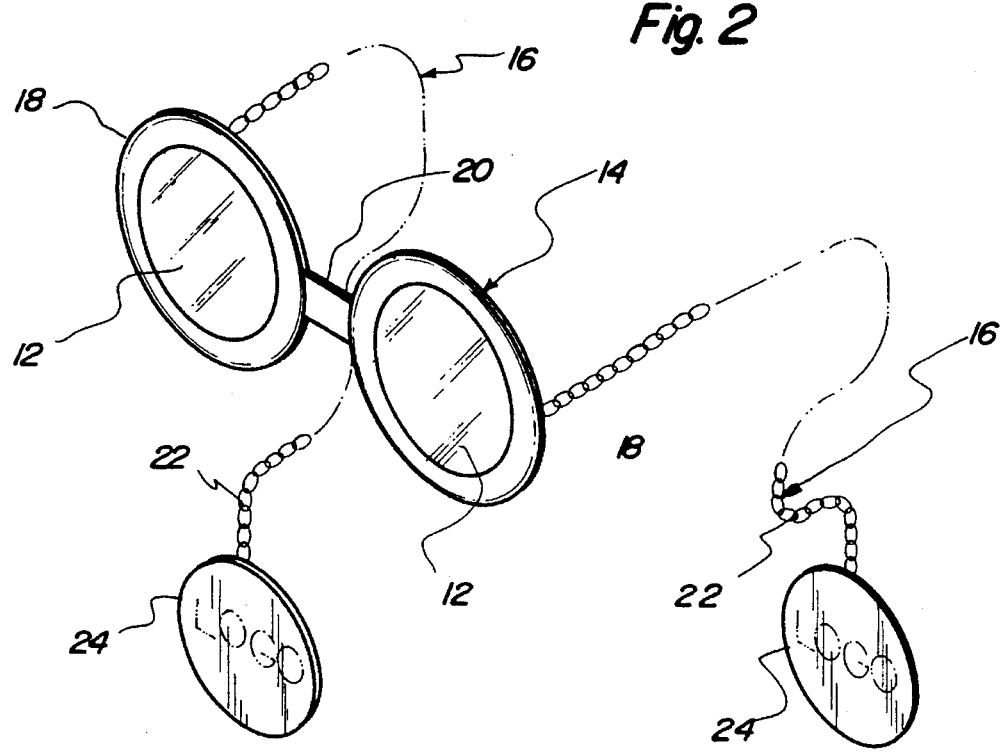
FIG. 2 is an isometric illustration of the interchangeable tethered glasses, per se.
Figure 3:
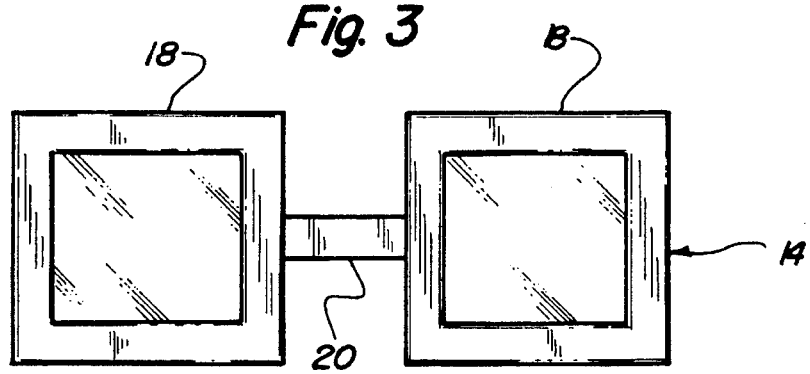
FIG. 3 is an isometric illustration of a first alternative form of a frame means of the invention.
Figure 4:
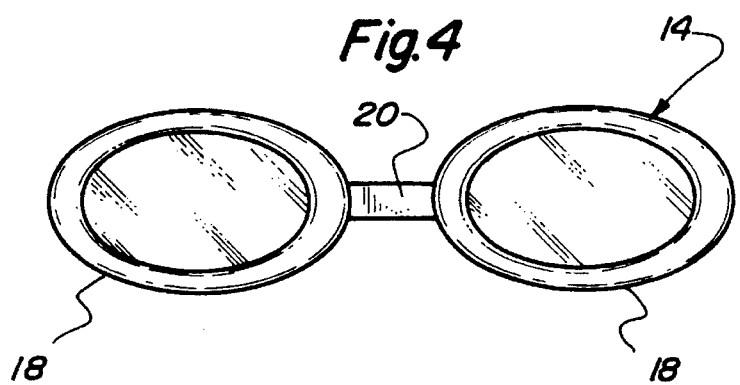
FIG. 4 is an isometric illustration of a second alternative form of a frame means of the invention.
Figure 5:
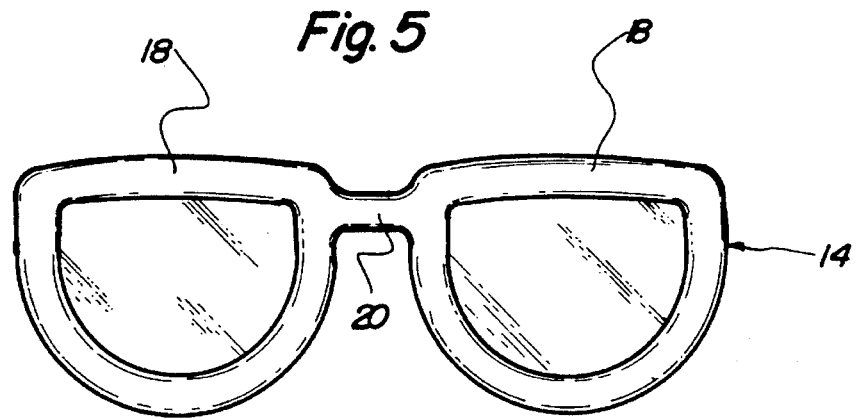
FIG. 5 is an isometric illustration of a third alternative form of a frame means of the invention.

As best illustrated in FIG. 2, it can be shown that the frame means 14 according to the present invention 10 preferable comprises a pair of lens frames 18 supported in a spaced relationship by a nose bridge 20 extending therebetween. Each of the lens frames receives an individual one of the lenses 12, whereby the lenses are supported in a spaced relationship in front of the wearer's eyes when the frame means 14 is positioned as shown in FIG. 1 of the drawings. Preferably and as illustrated in FIG. 2, the lens flames 18 are circular in shape, with the lenses 12 being correspondingly shaped. However, the lens frames 18 may be square in shape as shown in FIG. 3, ovoid in shape as shown in FIG. 4, or as shaped in FIG. 5. Such disparate shapes of the lens frames 18 and correspondingly shaped lenses 12 provide for differing amounts of lens coverage relative to the eyes of the wearer to filtered a desired amount of light therethrough.

With continuing reference to FIG. 2, it can be shown that the ear engaging means 16 according to the present invention 10 preferably each comprise a tether 22 coupled to an outboard lateral portion of the frame means 14. The tether 22 may comprise an elastic material, flexible string material, or other like elongated strand. However, the tether 22 preferably comprises a length of decorative chain as shown in the drawings. The tether 22 extends from the frame means 14 and terminates in a free distal end whereat a weight 24 is coupled thereto by a coupling means 26. By this structure, the tether can be extended over the ears of the wearer, as shown in FIG. 1, whereby the weights 24 will tension the tether to retain the glasses 10 relative to the face of the wearer.

Figure 6:
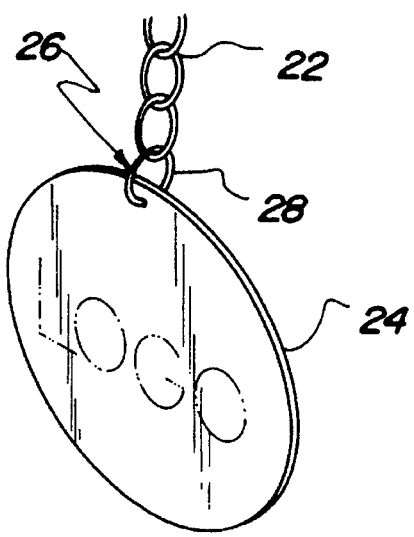
FIG. 6 is an isometric illustration of a coupling means of the invention.
Figure 7:
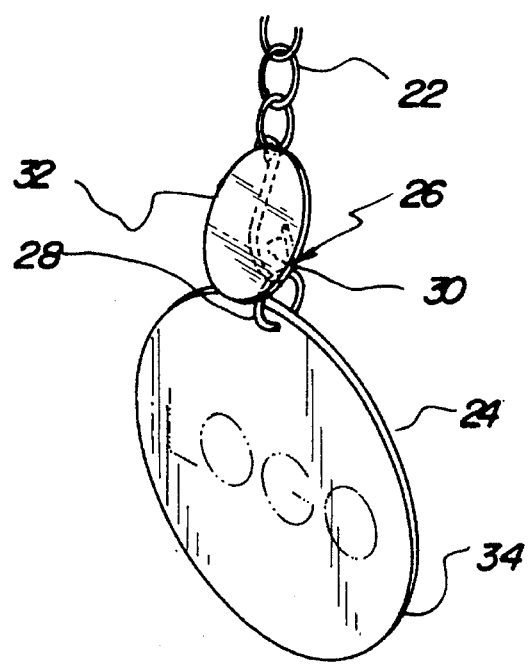
FIG. 7 is an isometric illustration of an alternative form of the coupling means of the invention.

As shown in FIG. 6, the coupling means 26 may simply comprise a ring 28 extending through an aperture in the weight 24 and being coupled to the free distal end of the tether 22. Alternatively and as shown in FIG. 7, the coupling means may further comprise a substantially J-shaped clip 30 coupled to the ring and the free distal end of the tether 22 to permit selective removal and interchanging of the weight 24 in a manner which will subsequently be described in more detail. If desired, a decorative facia 32 can be coupled to a front face of the J-shaped clip 30 so as to disguise the clip from view to improve aesthetic appearance of the device 10.

As shown in FIG. 7, the weight 24 may comprise an ear pendant in the shape of a circular planar member 34 including a logo or other decorative, informative, or advertising indicia printed thereon. FIG. 8 illustrates that the weight 24 may alternatively be shaped as a polygonal planar member 36. Further, FIG. 9 shows the weight 24 as a pivoted loop member 38 including an outer loop 40 having an inner loop 42 pivotally mounted therewithin by a hinge 44. The weight illustrated in FIG. 9 has further utility in creating a pleasant noise during impacting of the inner loop 42 against the outer loop 40 such as occurs during swinging or swaying of the device 10 during use thereof.

When the device 10 includes the removable coupling means 26 illustrated in FIG. 7, the present invention 10 may further comprise a storage box 46 for containing the various weights 24 disclosed above. To this end, the storage box includes a plurality of compartments, with a first circular planar member 34 being positioned in a first compartment and a second circular planar member 34 being positioned in a second compartment of the storage box. Further, a first pivoted loop member 38 can be positioned within a third compartment and a second pivoted loop member being positioned in a fourth compartment of the storage box. Finally, a first polygonal planar member 36 can be positioned in a fifth compartment, with a second polygonal planar member being positioned in a sixth compartment of the storage box. By this structure, the present invention allows an individual to customize an appearance of the device 10 by selecting and coupling a desired style of weights 24 to the free distal ends of the tethers 22.

In use, the interchangeable tethered glasses according to the present invention can be easily utilized to protect an individual's eyes from direct sunlight. The interchangeability of the weights of the present invention 10 thus permits an end user to selectively customize the device 10 as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Interchangeable tethered glasses comprising:

a pair of lenses;

a frame means for supporting the lenses over eyes of an individual;

ear engaging means coupled to opposed ends of the frame means for engaging ears of an individual to secure the frame means and lenses relative thereto, wherein the frame means comprises a pair of lens frames supported in a spaced relationship by a nose bridge extending therebetween, each of the lens frames receiving and supporting an individual one of the lenses, wherein the ear engaging means comprise a pair of tethers each coupled to an individual one of opposed outboard lateral portions of the frame means, the tethers each extending from the frame means and terminating in a free distal end; a pair of weights; and coupling means for securing each of the weights to the free distal end of an individual one of the tethers, wherein the coupling means comprises a ring extending through an aperture in the weight, the ring being coupled to the free distal end of the respective tether, wherein the coupling means further comprises a substantially J-shaped clip coupled to the ring and the free distal end of the tether to permit selective removal of the respective weight, and wherein the coupling means further comprises a decorative facia coupled to a front face of the J-shaped clip so as to disguise the clip from view.

2. The interchangeable tethered glasses of claim 1, wherein the lens frames and lenses are circular in shape.

3. The interchangeable tethered glasses of claim 1, wherein the lens frames and lenses are square in shape.

4. The interchangeable tethered glasses of claim 1, wherein the lens frames and lenses are ovoid in shape.

5. The interchangeable tethered glasses of claim 1, wherein the tether comprises a length of chain.

6. An interchangeable tethered glasses kit comprising:

a pair of lenses;

a frame means for supporting the lenses over eyes of an individual;

ear engaging means coupled to opposed ends of the frame means for engaging ears of an individual to secure the frame means and lenses relative thereto, the ear engaging means comprising a pair of tethers each coupled to an individual one of opposed outboard lateral portions of the frame means, the tethers each extending from the frame means and terminating in a free distal end;

a first pair of weights a second pair of weights disparately shaped relative to the first pair of weights;

and coupling means for securing the weights to the free distal ends of the tethers and for permitting interchanging of the second pair of weights in place of the first pair of weights, wherein the coupling means comprises a ring extending through an aperture in the weight, and a substantially J-shaped clip coupled to the ring and the free distal end of the tether to permit selective removal of the respective weight.

7. The interchangeable tethered glasses kit of claim 16, and further comprising a third pair of weights disparately shaped relative to the first and second pairs of weights, and further wherein the coupling means is further operable for securing the third pair of weights to the free distal ends of the tethers in place of the first and second pairs of weights.

8. The interchangeable tethered glasses kit of claim 7, and further comprising a storage box means for containing weights not coupled to the tethers.

9. The interchangeable tethered glasses kit of claim 8, wherein the first pair of weights each comprise a circular planar member.

10. The interchangeable tethered glasses kit of claim 9, wherein the second pair of weights each comprise a polygonal planar member.

11. The interchangeable tethered glasses kit of claim 10, wherein the third pair of weights each comprise a pivoted loop member including an outer loop and an inner loop pivotally mounted within the outer loop.

12. The interchangeable tethered glasses kit of claim 11, wherein the storage box includes a plurality of compartments, with a first circular planar member being positioned in a first compartment and a second circular planar member being positioned in a second compartment of the storage box, a first pivoted loop member positioned within a third compartment and a second pivoted loop member being positioned in a fourth compartment of the storage box, and a first polygonal planar member positioned in a fifth compartment, with a second polygonal planar member being positioned in a sixth compartment of the storage box.

* * * * *